US011325399B2

(12) United States Patent
Hoshi

(10) Patent No.: US 11,325,399 B2
(45) Date of Patent: May 10, 2022

(54) LASER DEVICE AND LASER PROCESSING METHOD

(71) Applicant: Sony Corporation, Tokyo (JP)

(72) Inventor: Mitsunari Hoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/772,563

(22) PCT Filed: Nov. 28, 2018

(86) PCT No.: PCT/JP2018/043693
§ 371 (c)(1),
(2) Date: Jun. 12, 2020

(87) PCT Pub. No.: WO2019/124004
PCT Pub. Date: Jun. 27, 2019

(65) Prior Publication Data
US 2020/0391519 A1    Dec. 17, 2020

(30) Foreign Application Priority Data

Dec. 20, 2017   (JP) .............................. JP2017-243545

(51) Int. Cl.
*B41J 2/44*       (2006.01)
*B41J 2/475*      (2006.01)
(Continued)

(52) U.S. Cl.
CPC ............. *B41J 2/442* (2013.01); *B23K 26/064* (2015.10); *B23K 26/0643* (2013.01);
(Continued)

(58) Field of Classification Search
CPC ......... B41J 2/442; B41J 2/4753; B23K 26/53; B23K 26/55; B23K 26/0853;
(Continued)

(56) References Cited

U.S. PATENT DOCUMENTS

| 4,336,439 A * | 6/1982 | Sasnett ................. B23K 26/06 |
| | | 219/121.68 |
| 2005/0006560 A1* | 1/2005 | Horie ................. G01B 11/0641 |
| | | 250/205 |

(Continued)

FOREIGN PATENT DOCUMENTS

| JP | H07-009181 | 1/1995 |
| JP | 2001-314991 | 11/2001 |
| JP | 2004-249539 | 9/2004 |

OTHER PUBLICATIONS

International Search Report issued in International Patent Application No. PCT/JP2018/043693 dated Feb. 19, 2019 and English translation of same. 3 pages.

(Continued)

*Primary Examiner* — Matthew Luu
*Assistant Examiner* — Kendrick X Liu
(74) *Attorney, Agent, or Firm* — K&L Gates LLP

(57) ABSTRACT

A laser device according to one embodiment of the present disclosure includes a light source and a reflection-type polarizer. The light source causes laser light to oscillate. The reflection-type polarizer is disposed on an optical path of the laser light and has a transmission axis coinciding with a polarization direction of the laser light.

10 Claims, 10 Drawing Sheets

(51) Int. Cl.
  *B23K 26/53* (2014.01)
  *B23K 26/55* (2014.01)
  *B23K 26/08* (2014.01)
  *B41M 5/26* (2006.01)
  *B41M 5/28* (2006.01)
  *G02B 27/28* (2006.01)
  *B23K 26/064* (2014.01)
  *B23K 26/06* (2014.01)

(52) U.S. Cl.
  CPC ...... *B23K 26/0648* (2013.01); *B23K 26/0665* (2013.01); *B23K 26/0853* (2013.01); *B23K 26/53* (2015.10); *B23K 26/55* (2015.10); *B41J 2/4753* (2013.01); *B41M 5/26* (2013.01); *B41M 5/262* (2013.01); *B41M 5/267* (2013.01); *B41M 5/282* (2013.01); *G02B 27/283* (2013.01); *G02B 27/286* (2013.01)

(58) Field of Classification Search
  CPC ...... B41M 5/262; B41M 5/267; B41M 5/282; G02B 27/283; G02B 27/286
  See application file for complete search history.

(56) References Cited

U.S. PATENT DOCUMENTS

| | | | |
|---|---|---|---|
| 2006/0056024 A1* | 3/2006 | Ahn | G02B 5/3058 359/485.05 |
| 2013/0222770 A1* | 8/2013 | Tomiyama | G02B 5/3025 353/20 |

OTHER PUBLICATIONS

Written Opinion issued in International Patent Application No. PCT/JP2018/043693 dated Feb. 19, 2019 and English translation of same. 9 pages.

\* cited by examiner

[FIG. 1]
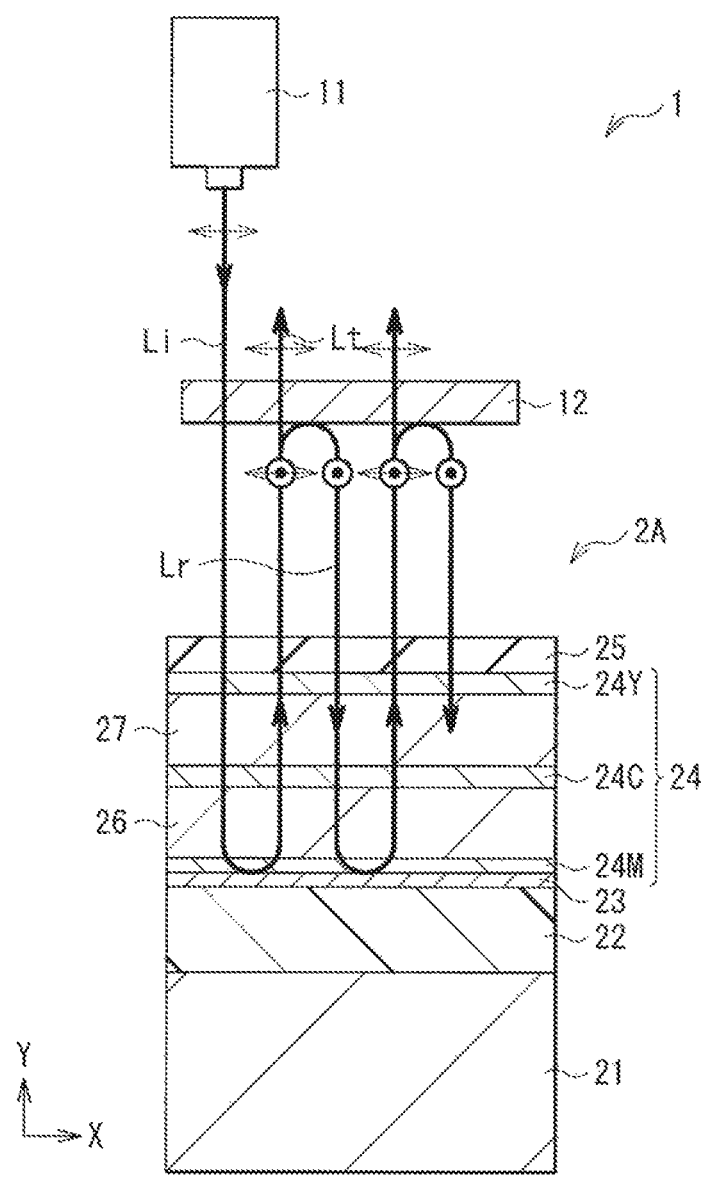

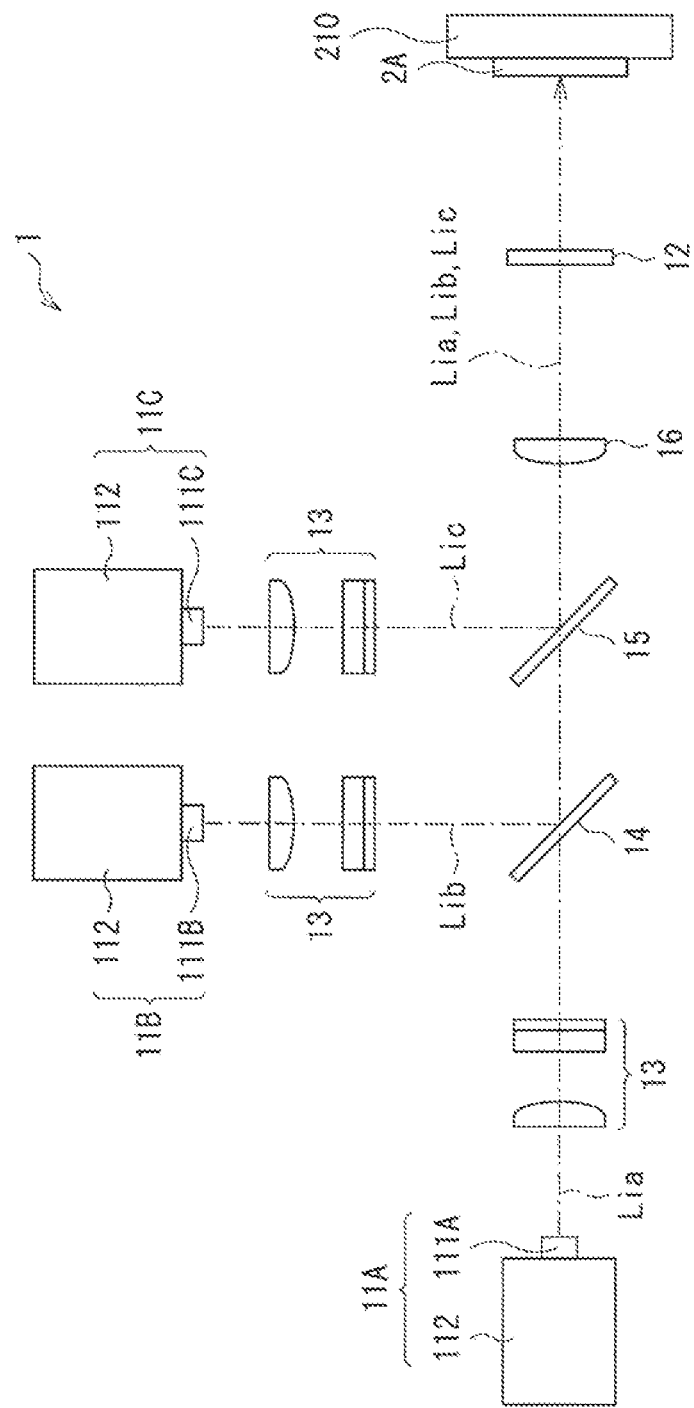
[FIG. 2]

[FIG. 3]
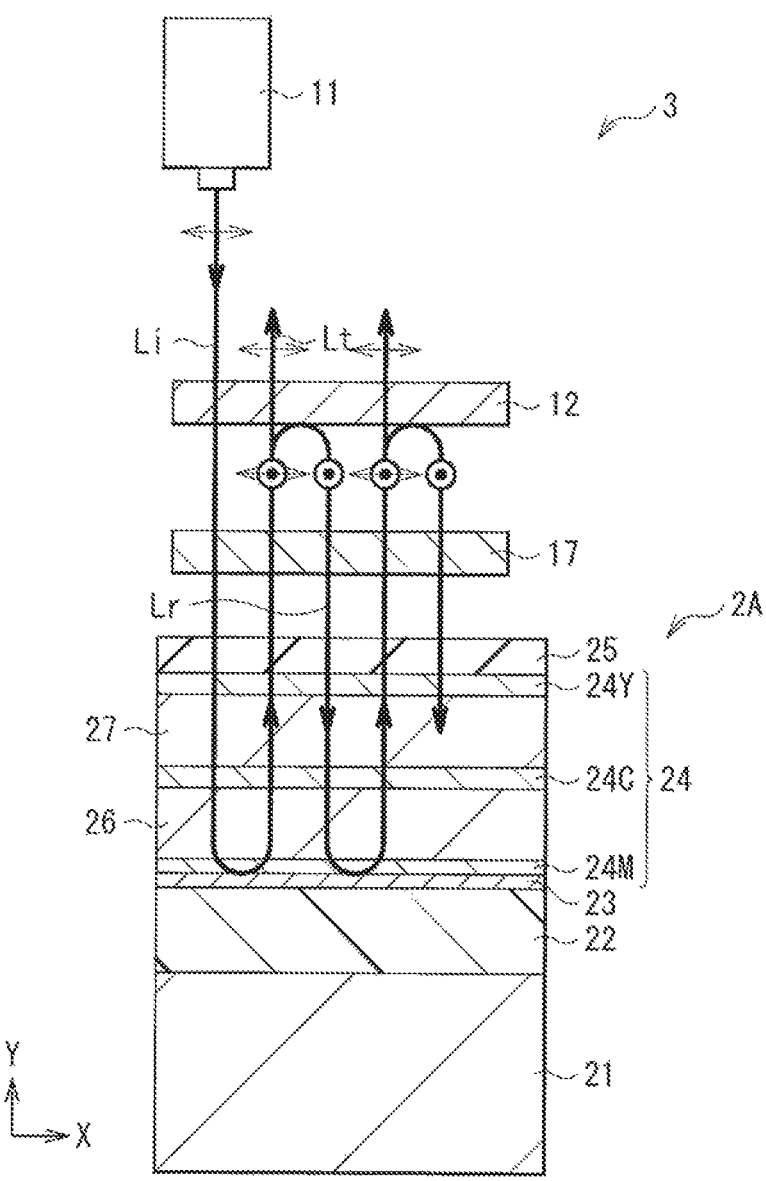

[FIG. 4]
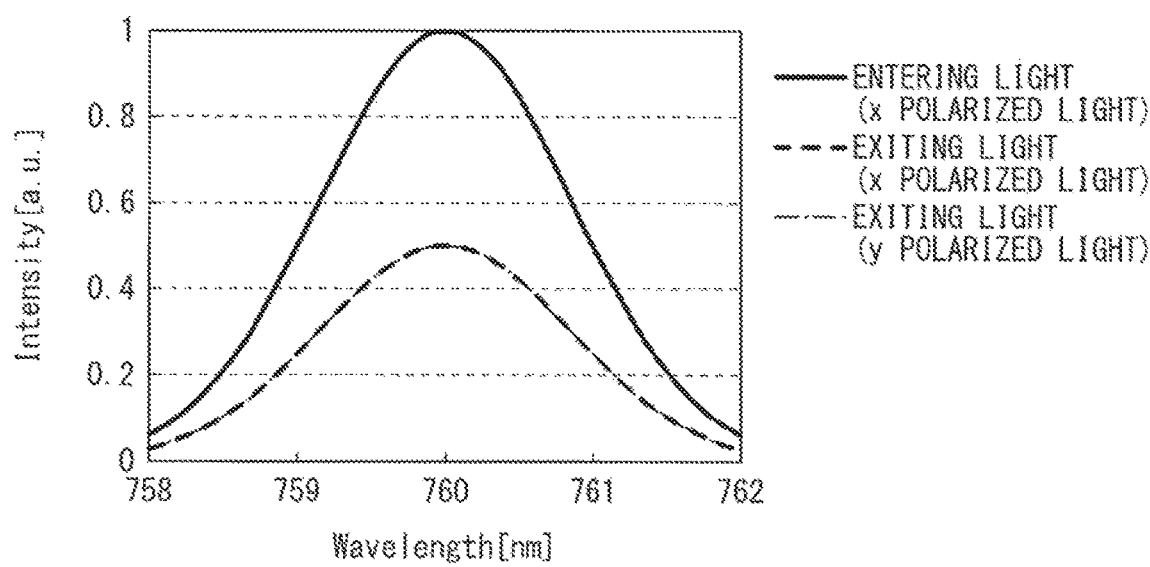
[FIG. 5]
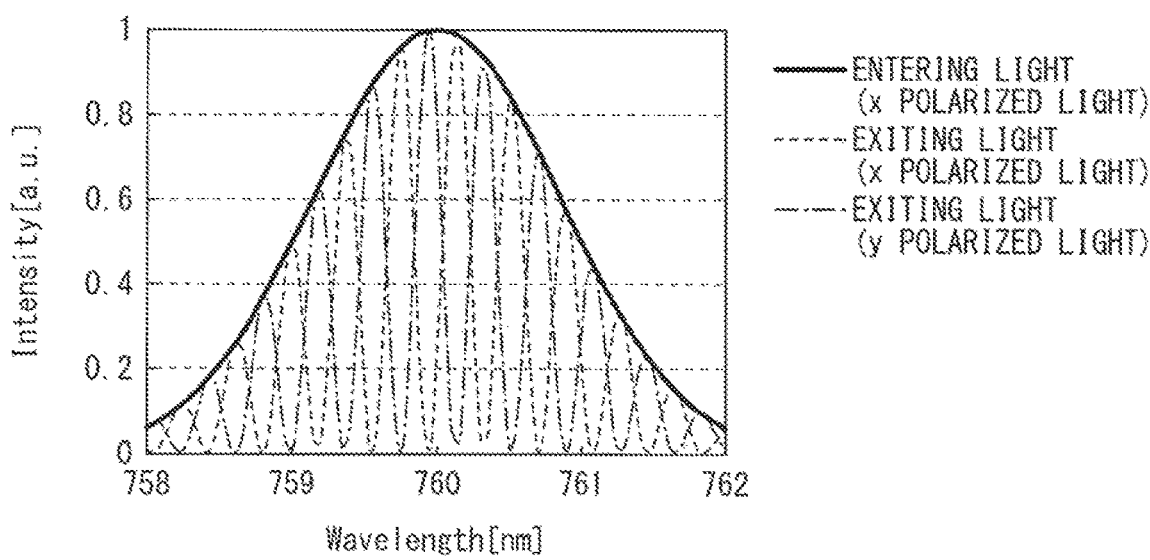

[FIG. 6]
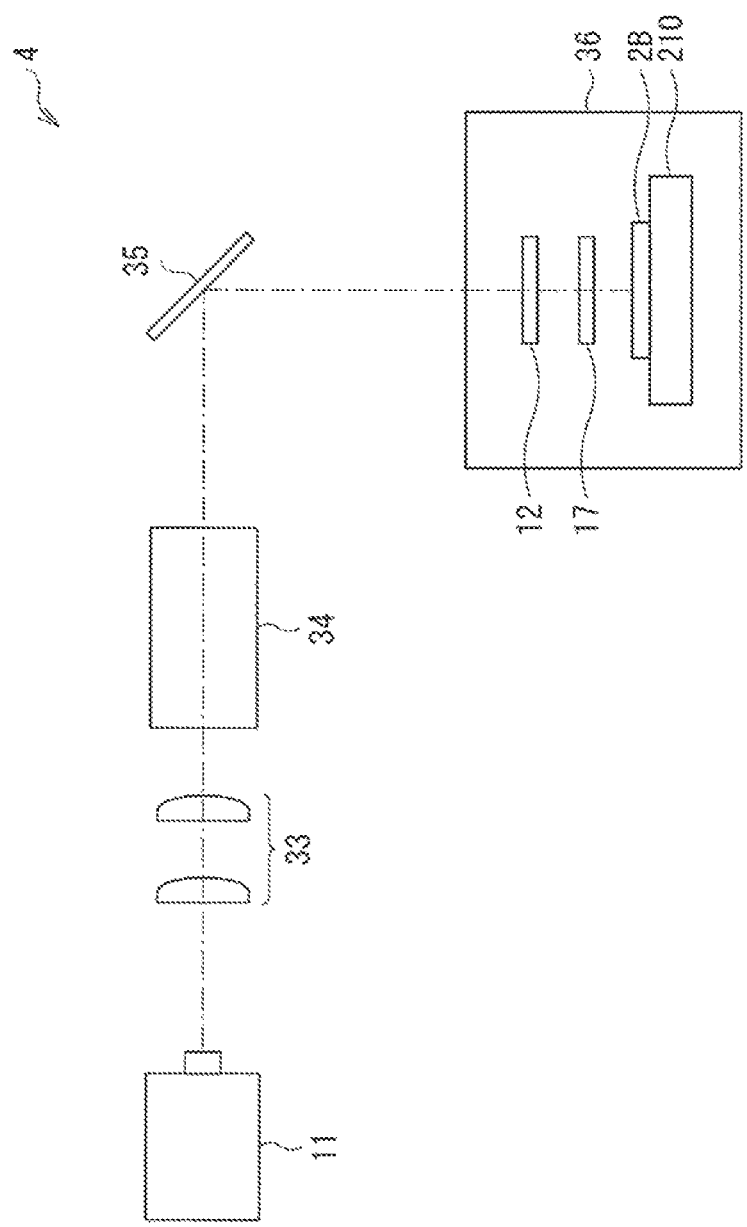

[FIG. 7]
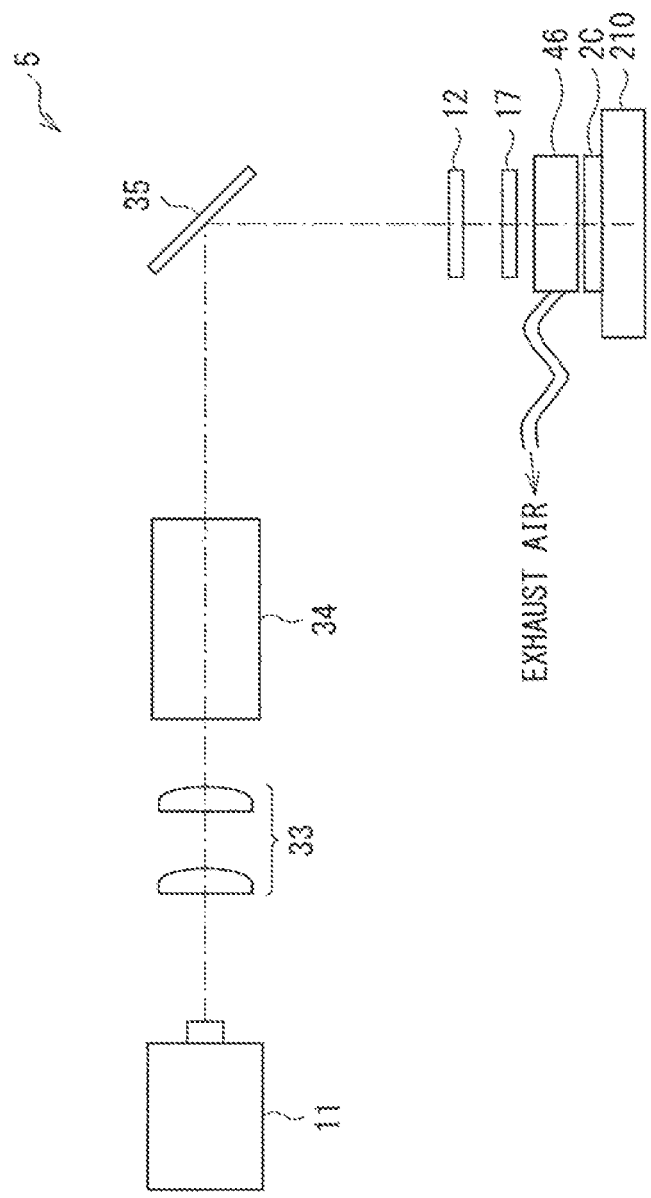

[FIG. 8A]
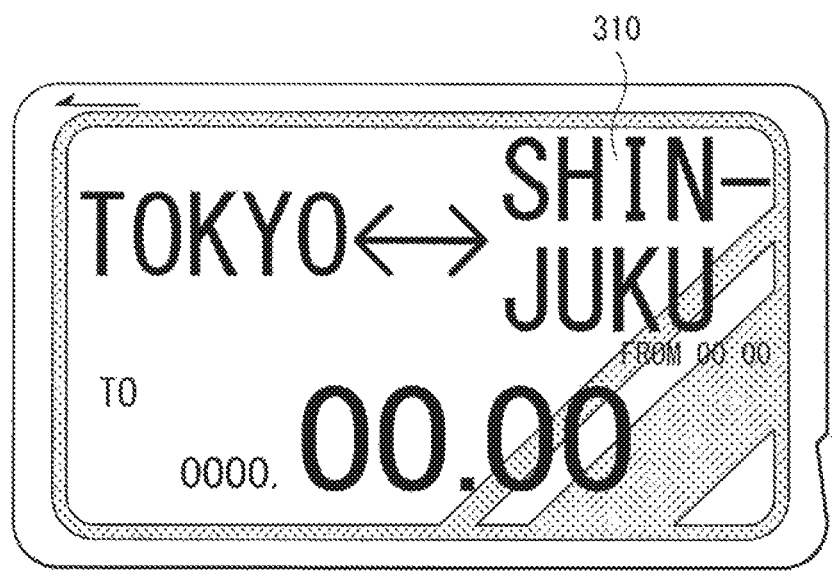
[FIG. 8B]
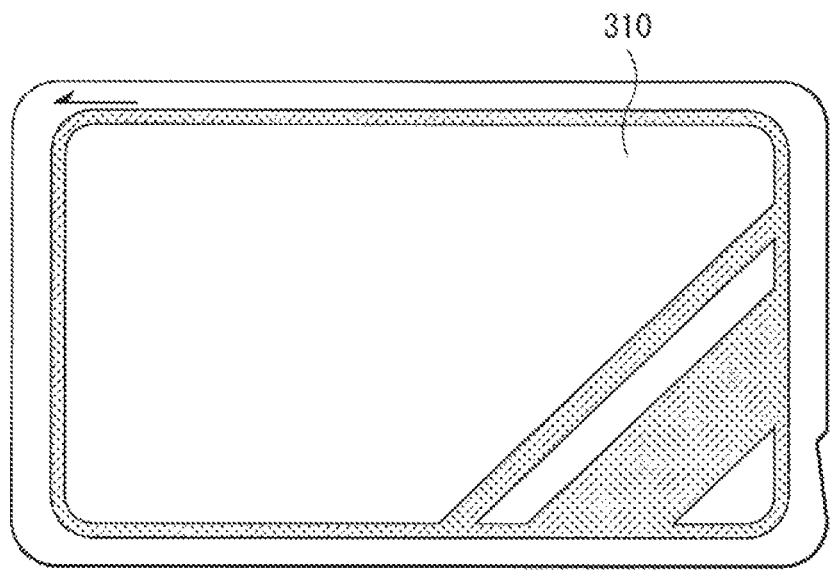

[FIG. 9A]
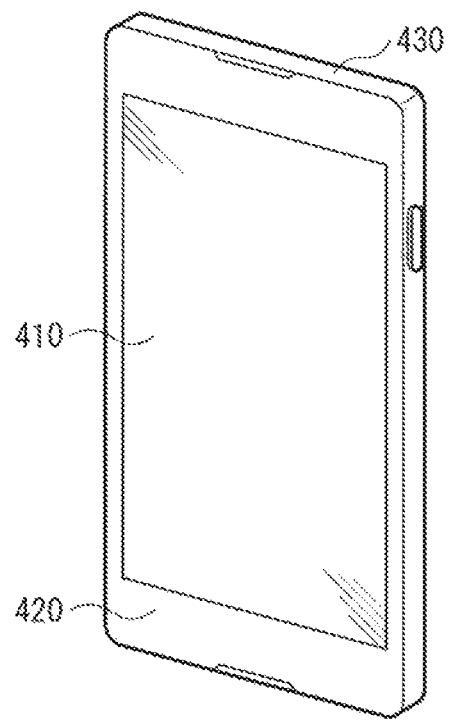
[FIG. 9B]
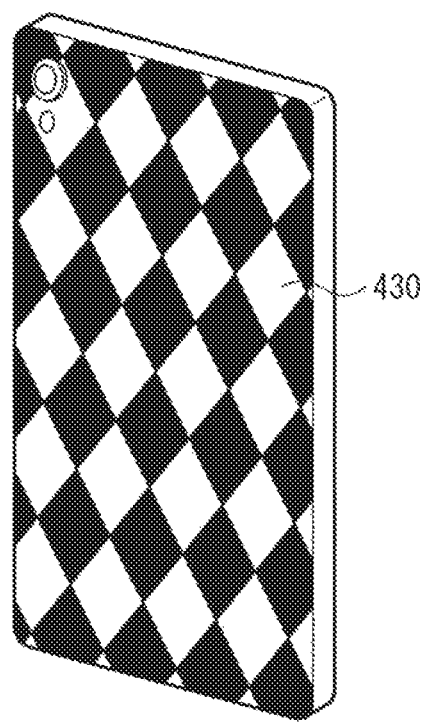

[ FIG. 10A ]
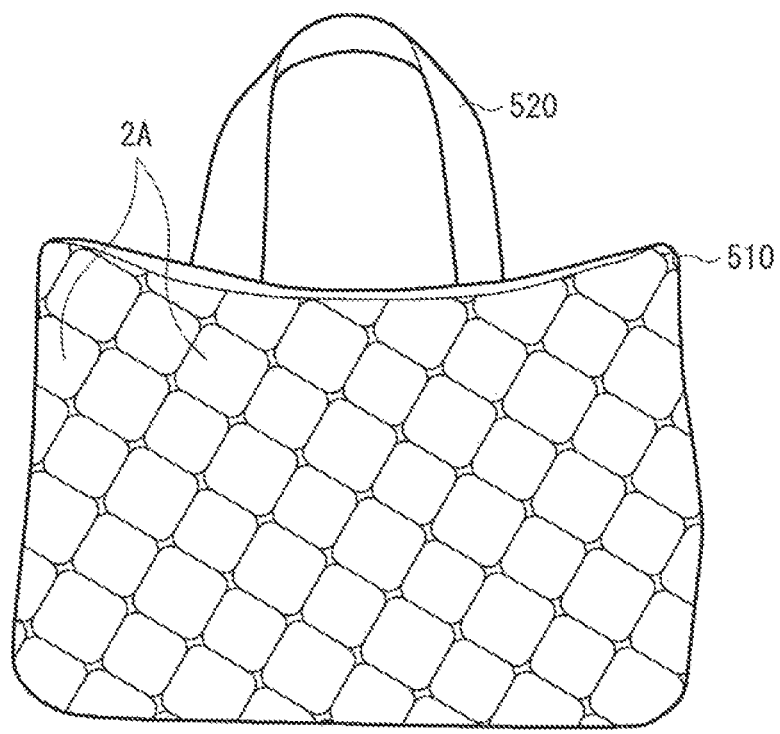
[ FIG. 10B ]

[FIG. 11]
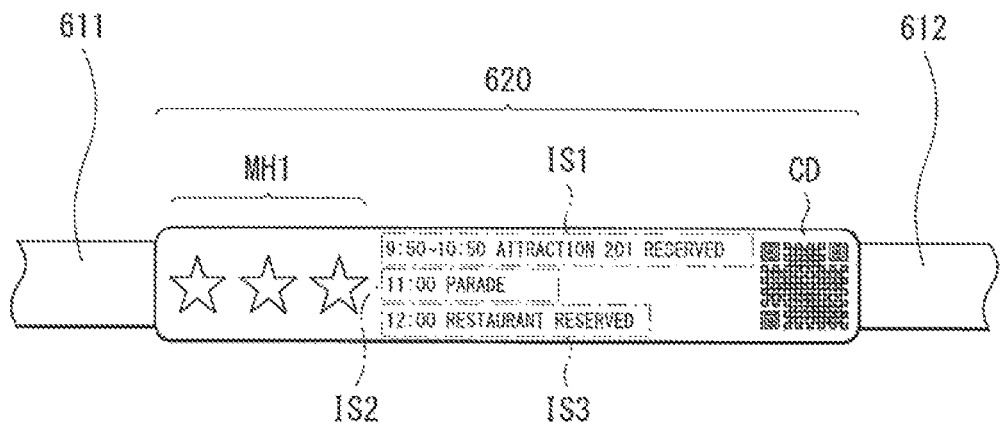
[FIG. 12]
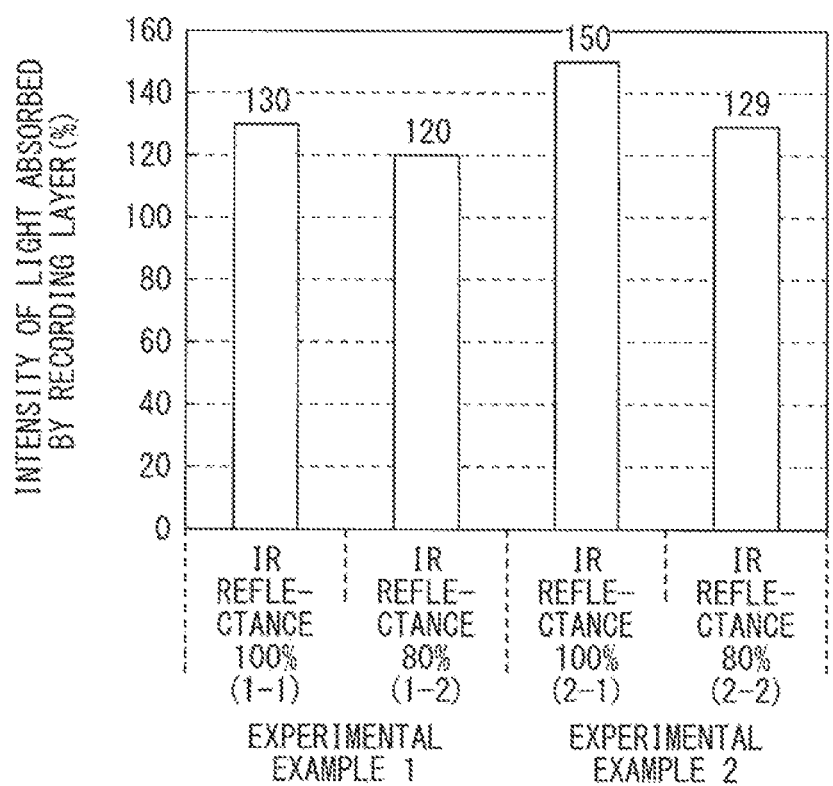

LASER DEVICE AND LASER PROCESSING METHOD

TECHNICAL FIELD

The present disclosure relates to, for example, a laser device that modifies or processes an object to be irradiated with laser light and a laser processing method using this.

BACKGROUND ART

In recent years, a heat-sensitive recording medium that includes a recording layer including a heat-sensitive color-developing composition and a photothermal conversion agent that absorbs infrared rays has been developed. Such a heat-sensitive recording medium allows information to be recorded on the recording layer in a non-contact state by using a photothermal conversion effect. For example, a recording device that enables application of a plurality of types of laser light having different wavelengths as described in Patent Literature 1 has been developed.

CITATION LIST

Patent Literature

PTL 1: Japanese Unexamined Patent Application Publication No. 2004-249539

SUMMARY OF THE INVENTION

By the way, regarding the heat-sensitive recording medium as described above, it is requested to improve a recording speed and a display quality. Development of a recording device that enables improvement of laser use efficiency has been desired.

It is desirable to provide a laser device and a laser processing method that enable improvement of laser use efficiency.

A laser device according to one embodiment of the present disclosure includes a light source and a reflection-type polarizer. The light source causes laser light to oscillate. The reflection-type polarizer is disposed on an optical path of the laser light and has a transmission axis coinciding with a polarization direction of the laser light.

A laser processing method according to one embodiment of the present disclosure includes irradiating an object to be irradiated with oscillating laser light from a light source through a reflection-type polarizer that has a transmission axis coinciding with a polarization direction of the laser light.

In the laser device and the laser processing method according to one embodiment of the present disclosure, the reflection-type polarizer that has the transmission axis coinciding with the polarization direction of the laser light is disposed on the optical path of the laser light. This makes it possible to multiply reflect the laser light between the object to be irradiated and the reflection-type polarizer.

According to the laser device and the laser processing method according to one embodiment of the present disclosure, since the reflection-type polarizer that has the transmission axis coinciding with the polarization direction of the laser is disposed between the light source that causes the laser to oscillate and the object to be irradiated, the laser light is multiply reflected between the reflection-type polarizer and the object to be irradiated. Therefore, it is possible to improve laser use efficiency of the object to be irradiated.

Note that effects described here are not necessarily limited and any effect described in the present disclosure may be provided.

BRIEF DESCRIPTION OF DRAWINGS

FIG. 1 is a schematic diagram for explaining an example of a configuration of a main portion of a laser device (a recording device) and a recording method according to a first embodiment of the present disclosure.

FIG. 2 is an outline diagram illustrating an example of an overall configuration of the laser device illustrated in FIG. 1.

FIG. 3 is a schematic diagram for explaining an example of a configuration of a main portion of a laser device (a recording device) and a recording method according to a second embodiment of the present disclosure.

FIG. 4 is a characteristic diagram illustrating a relationship between wavelengths and intensities of entering light and exiting light in a case where a λ/8 plate is used.

FIG. 5 is a characteristic diagram illustrating a relationship between wavelengths and intensities of entering light and exiting light in a case where calcite is used.

FIG. 6 is an outline diagram illustrating an example of an overall configuration of a laser device (an annealing device) according to a third embodiment of the present disclosure.

FIG. 7 is an outline diagram illustrating an example of an overall configuration of a laser device (a processing device) according to a fourth embodiment of the present disclosure.

FIG. 8A is a perspective diagram illustrating an example of an appearance of a first application example.

FIG. 8B is a perspective diagram illustrating another example of the appearance of the first application example.

FIG. 9A is a perspective diagram illustrating an example of an appearance (front surface side) of a second application example.

FIG. 9B is a perspective diagram illustrating an example of an appearance (back surface side) of the second application example.

FIG. 10A is a perspective diagram illustrating an example of an appearance of a third application example.

FIG. 10B is a perspective diagram illustrating another example of the appearance of the third application example.

FIG. 11 is an explanatory diagram illustrating one exemplary configuration of a fourth application example.

FIG. 12 is a characteristic diagram illustrating a relationship between an intensity of light absorbed by a recording layer and an IR reflectance in each of experimental examples 1 and 2.

MODES FOR CARRYING OUT THE INVENTION

Embodiments of the present disclosure will be described below in detail with reference to the drawings. The following description is one specific example of the present disclosure, and the present disclosure is not limited to the following modes. Furthermore, arrangement, dimensions, dimension ratios, and the like of each component of the present disclosure are not limited to those illustrated in each drawing. Note that an order of description is as follows.
1. First Embodiment (An example in which a reflection-type polarizer is disposed between a light source and an object to be irradiated)
 1-1. Configuration of Recording Device
 1-2. Method of Recording on Recording Medium
 1-3. Workings and Effects 2. Second Embodiment (An example in which a retarder is further disposed between the reflection-type polarizer and the object to be irradiated)
3. Third Embodiment (Annealing device)
4. Fourth Embodiment (Processing device)
5. Application Examples
6. Examples 1. First Embodiment FIG. 1 schematically illustrates a configuration of a main portion of a laser device (a recording device 1) according to a first embodiment of the present disclosure together with an object to be irradiated (a recording medium 2A). The recording device 1 records information on the recording medium 2A by using, for example, a semiconductor laser (for example, a semiconductor laser 111A; refer to FIG. 2) as a light source 11 and irradiating the recording medium 2A with oscillating laser light (laser light Li) from the semiconductor laser 111A. The recording device 1 according to the present embodiment has a configuration in which a reflection-type polarizer 12 is disposed on an optical path of the oscillating laser light Li from the light source 11.

(1-1. Configuration of Recording Device)

FIG. 2 illustrates an example of an overall configuration of each optical system included in the recording device 1. The recording device 1 according to the present embodiment records information on the recording medium 2A including, for example, a recording layer 24 including three layers (recording layers 24M, 24C, and 24Y) that develop colors with wavelengths different from each other. The recording device 1 according to the present embodiment includes, for example, three light sources 11A, 11B, and 11C as the light sources 11, the reflection-type polarizer 12, a beam shaping lens 13, dichroic mirrors 14 and 15, and a condensing lens 16.

The light sources 11A, 11B, and 11C respectively include, for example, one or a plurality of semiconductor lasers 111A, 111B, and 111C, and each of the semiconductor lasers 111A, 111B, and 111C is disposed on, for example, a heatsink 112. The semiconductor lasers 111A, 111B, and 111C respectively cause laser light Lia, laser light Lib, and laser light Lic having wavelengths different from each other to oscillate. As an example, the semiconductor laser 111A causes, for example, the laser light Lia having a wavelength of 915 nm to oscillate. The semiconductor laser 111B causes, for example, the laser light Lib having a wavelength of 860 nm to oscillate. The semiconductor laser 111C causes, for example, the laser light Lic having a wavelength of 760 nm to oscillate.

The reflection-type polarizer 12 transmits one of two types of polarized light orthogonal to each other and reflects the other. For example, the reflection-type polarizer 12 transmits X polarized light and reflects Y polarized light. In the present embodiment, the reflection-type polarizer 12 is opposed to the recording medium 2A and is disposed to cause a transmission axis to coincide with polarization directions of the laser light Lia, the laser light Lib, and the laser light Lic. Furthermore, it is preferable that the reflection-type polarizer 12 be disposed to be approximately perpendicular to an optical axis of each of the laser light Lia, the laser light Lib, and the laser light Lic. This makes it possible to efficiently reflect the laser light Li reflected by the recording medium 2A to the recording medium 2A. As the reflection-type polarizer 12, for example, a wire grid polarizer (manufactured by Moxtek, Inc.), a reflection polarizer film (manufactured by 3M Company), or the like can be used.

The beam shaping lens 13 shapes the laser light Lia, the laser light Lib, and the laser light Lic respectively emitted from the semiconductor lasers 111A, 111B, and 111C into a desired shape and includes, for example, a plurality of lenses in combination. The beam shaping lenses 13 are disposed, for example, on optical axes of the respective semiconductor lasers 111A, 111B, and 111C.

The dichroic mirrors 14 and 15 have a property that selectively reflects light in a predetermined wavelength band and transmits light in other wavelength bands. The dichroic mirror 14 is disposed, for example, at a position where the laser light Lia emitted from the semiconductor laser 111A intersects with the laser light Lib emitted from the semiconductor laser 111B. The dichroic mirror 14 reflects the laser light Lib and transmits the laser light Lia. The dichroic mirror 15 is disposed, for example, at a position where the laser light Lia emitted from the semiconductor laser 111A intersects with the laser light Lic emitted from the semiconductor laser 111C. The dichroic mirror 15 reflects the laser light Lic and transmits the laser light Lia and the laser light Lib reflected by the dichroic mirror 14. This causes the laser light Lia, the laser light Lib, and the laser light Lic to be multiplexed and to travel in the same direction.

The condensing lens 16 makes light concentrate in a desired direction or on a desired place. The laser light Lia, the laser light Lib, and the laser light Lic that have passed through the dichroic mirror 15 or have been reflected by the dichroic mirror 15 pass through the condensing lens 16, and the recording medium 2A is irradiated with the laser light Lia, the laser light Lib, and the laser light Lic via the reflection-type polarizer 12.

The recording medium 2A includes, for example, an optical thin film 23, the recording layer 24, and a protection film 25 laminated in this order and is disposed, for example, on a support base 21 with an adhesive layer 22 in between.

The support base 21 is directed to supporting of the recording layer 24. The support base 21 includes a material having excellent heat resistance and having excellent dimension stability in a planar direction. The support base 21 may have either of optical transparency or non-optical transparency. The support base 21 may be, for example, a rigid substrate such as a wafer or may include flexible thin glass, a film, paper, or the like. By using a flexible substrate as the support base 21, it is possible to achieve a flexible (foldable) recording medium.

Examples of a material included in the support base 21 include an inorganic material, a metal material, a polymer material such as plastic, and the like. Specifically, examples of the inorganic material include silicon (Si), silicon oxide ($SiO_x$), silicon nitride ($SiN_x$), aluminum oxide ($AlO_x$), magnesium oxide ($MgO_x$), and the like. The silicon oxide includes, glass, spin-on-glass (SOG), or the like. Examples of the metal material include single metal such as aluminum (Al), copper (Cu), silver (Ag), gold (Au), platinum (Pt), palladium (Pd), nickel (Ni), tin (Sn), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), lead (Pb), and the like or an alloy including two or more kinds of these. Specific examples of the alloy include stainless steel (SUS), an aluminum alloy, a magnesium alloy, a titanium alloy, and the like. Examples of the polymer material include a phenolic resin, an epoxy resin, a melamine resin, a urea resin, an unsaturated polyester resin, an alkyd resin, an urethane resin, polyimide, polyethylene, high-density polyethylene, medium-density polyethylene, low-density polyethylene, polypropylene, polyvinyl chloride, polyvinylidene chloride, polystyrene, polyvinyl acetate, polyurethane, an acrylonitrile butadiene styrene resin (ABS), an acrylic resin (PMMA), polyamide, nylon, polyacetal, polycarbonate (PC), modified-polyphenyleneether, polyethylene terephthalate (PET), polybutylene terephthalate, cyclic polyolefin, polyphenylene sulfide, polytetrafluoroethylene (PTFE), polysulfone, polyether sulfone, amorphous polyarylate, liquid crystal polymer, polyetheretherketone (PEEK), polyamide-imide, polyethylene naphthalate (PEN), triacetylcellulose, cellulose, a copolymer of those, glass fiber reinforced plastic, carbon fiber reinforced plastic (CFRP), and the like.

The adhesive layer 22 is directed to fixing of the recording medium 2A on the support base 21. As a material of the adhesive layer 22, for example, it is possible to use general-purpose adhesive agent and an adhesive tape. Specifically, examples thereof include acrylic adhesive (adhesive agent), epoxy adhesive, siloxane adhesive, urethane adhesive, silane coupling agent, natural rubber adhesive, synthetic rubber adhesive, and the like.

The optical thin film 23 reflects at least a portion of wavelengths in an infrared region and transmits wavelengths in a visible region. The optical thin film 23 has, for example, a configuration in which two kinds of thin films, having optical transparency and having different refractive indices, are alternately laminated. Examples of a material of the two kinds of thin films include a metal film including Mg, Al, Hf, Nb, Zr, Sc, Ta, Ga, Zn, Y, B, Ti, or Ag, an oxide film, a nitride film, an oxynitride film, or the like. Specifically, examples of the metal film include Ag, AgBi, Al, and the like. Examples of the oxide film, the nitride film, or the oxynitride film include $SiO_2$, $TiO_2$, $Nb_2O_5$, $ZrO_2$, $Ta_2O_5$, ZnO, $Al_2O_3$, $HfO_2$, $Si_3N_4$, AlN, and the like. As a combination of the above materials, it is preferable to alternately laminate a thin film including a high-refractive index material and a thin film including a low-refractive index material, for example, as $TiO_2$/AgBi, $TiO_2$/$SiO_2$, etc. This makes it possible to obtain a high optical reflectance.

The recording layer 24 allows for recording of information by heat and includes a heat-sensitive color-developing composition. The recording layer 24 is configured by using, for example, a material that allows for repetitive and stable recording and control of a decolored state and a colored state as the heat-sensitive color-developing composition. The recording layer 24 includes, for example, three layers (recording layers 24M, 24C, and 24Y) having colors different from each other. Each of the recording layers 24M, 24C, and 24Y is formed by using, for example, a polymer material including a coloring compound that assumes a different color, a developing/reducing agent corresponding to each coloring compound, and a photothermal conversion material that absorbs light in a different wavelength band and generates heat.

Specifically, the recording layer 24M includes, for example, a coloring compound that develops a color of magenta, a developing/reducing agent corresponding thereto, and a photothermal conversion material that absorbs infrared rays having, for example, a wavelength $\lambda_1$ (for example, a wavelength of 915 nm) and develops. The recording layer 24C includes, for example, a coloring compound that develops a color of cyan, a developing/reducing agent corresponding thereto, and a photothermal conversion material that absorbs infrared rays having, for example, a wavelength $\lambda_2$ (for example, a wavelength of 860 nm) and generates heat. The recording layer 24Y includes, for example, a coloring compound that develops a color of yellow, a developing/reducing agent corresponding thereto, and a photothermal conversion material that absorbs infrared rays having, for example, a wavelength $\lambda_3$ (for example, a wavelength of 760 nm) and generates heat. This makes it possible to obtain a display medium that enables multicolor display.

Examples of the coloring compound include a leuco dye. Examples of the leuco dye include an existing dye for thermosensitive paper. Specifically, examples thereof include a compound that includes, for example, an electron-donating radical in a molecule indicated in the following Formula (1).

[Chem. 1]

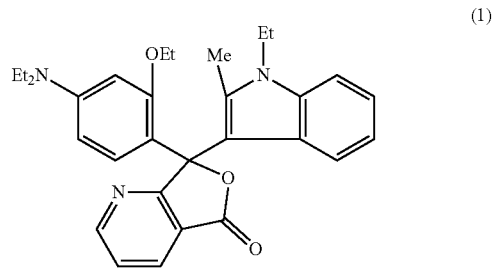

(1)

The developing/reducing agent is directed to, for example, coloring of a colorless coloring compound or decoloring of a coloring compound that is colored in a predetermined color. Examples of the developing/reducing agent include a compound that has a salicylic acid skeleton indicated in the following general formula (2) and includes a radical having electron acceptability in a molecule.

[Chem. 2]

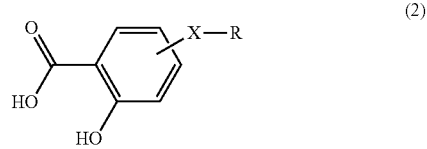

(2)

(X is any one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—. R indicates a linear hydrocarbon group having carbon number that is equal to or more than 25 and equal to or less than 34).

For example, the photothermal conversion material absorbs light in a predetermined wavelength band in a near infrared ray region and generates heat. As the photothermal conversion material, it is preferable to use a near infrared ray absorbing a dye that, for example, has an absorption peak in a range of a wavelength equal to or more than 700 nm and equal to or less than 2000 nm and performs almost no absorption in a visible region. Specifically, examples thereof include a compound having a phthalocyanine skeleton (phthalocyanine dyes), a compound having a squarylium skeleton (squarylium dyes), and, for example, an inorganic compound, and the like. Examples of the inorganic compound include a metallic complex such as a dithio complex, diimonium salt, aminium salt, an inorganic compound, and the like. Examples of the inorganic compound include metallic oxide such as graphite, carbon black, metal powder particles, tricobalt tetroxide, iron oxide, chromic oxide, copper oxide, titanium black, ITO, and the like, metallic nitride such as niobium nitride, metallic carbide such as tantalum carbide, metallic sulfide, various magnetic powders, and the like. In addition, a compound that has a cyanine skeleton having excellent light resistance and excellent heat resistance (cyanine dyes) may be used.

Note that, here, the excellent light resistance indicates that decomposition does not occur at the time of laser irradiation. The excellent heat resistance indicates, for example, that the maximum absorption peak value of an absorption spectrum does not vary by 20% or more when it is deposited with a polymer material and is kept at 150° C. for 30 minutes, for example. Examples of a compound having such a cyanine skeleton includes a compound including, in a molecule, any one of counter ions such as $SbF_6$, $PF_6$, $BF_4$, $ClO_4$, $CF_3SO_3$, and $(CF_3SO_3)_2N$, a methine chain having a five-membered ring or a six-membered ring, or both. Note that it is preferable that a compound having a cyanine skeleton used for a reversible recording medium according to the present embodiment include both of the counter ion described above and an annular structure such as the five-membered ring or the six-membered ring in the methine chain. However, if at least one of the above is included, sufficient light resistance and sufficient heat resistance are secured.

As the photothermal conversion material, it is further preferable to select a combination of materials whose absorption wavelength bands are not overlapped with each other. This makes it possible to selectively color or decolor a desired layer of the recording layers 24M, 24C, and 24Y.

It is preferable to use the polymer material that allows the coloring compound, the developing/reducing agent, and the photothermal conversion material to be uniformly and easily dispersed. The polymer material includes, for example, a thermoset resin and a thermoplastic resin. Specifically, examples thereof include polyvinyl chloride, polyvinyl acetate, vinyl-chloride-vinyl-acetate copolymer, ethyl cellulose, polystyrene, styrene copolymer, a phenoxy resin, polyester, aromatic polyester, polyurethane, polycarbonate, polyacrylic acid ester, polymethacrylic acid ester, acrylic acid copolymer, maleic acid polymer, polyvinyl alcohol, modified polyvinyl alcohol, hydroxyethyl cellulose, carboxymethyl cellulose, starch, and the like.

Each of the recording layers 24M, 24C, and 24Y includes at least one kind of the coloring compound, at least one kind of the developing/reducing agent, and at least one kind of the photothermal conversion material as the heat-sensitive color-developing composition. It is preferable to use the coloring compound and the developing/reducing agent, for example, at the coloring compound: the developing/reducing agent=1:2 (ratio by weight). A photothermal conversion agent changes depending on the film thicknesses of the recording layers 24M, 24C, and 24Y. Furthermore, the recording layer 24 may include, for example, various additives such as a sensitizer, an ultraviolet ray absorber, or the like, in addition to the above materials.

Furthermore, the recording layers 24M, 24C, and 24Y may include, for example, various additives such as a sensitizer, an ultraviolet ray absorber, or the like, in addition to the above materials.

Moreover, heat insulating layers 26 and 27 are respectively provided between the recording layers 24M and 24C and between the recording layers 24C and 24Y. The heat insulating layers 26 and 27 include a polymer material having, for example, general translucency. Examples of a specific material include polyvinyl chloride, polyvinyl acetate, vinyl-chloride-vinyl-acetate copolymer, ethyl cellulose, polystyrene, styrene copolymer, a phenoxy resin, polyester, aromatic polyester, polyurethane, polycarbonate, polyacrylic acid ester, polymethacrylic acid ester, acrylic acid copolymer, maleic acid polymer, polyvinyl alcohol, modified polyvinyl alcohol, hydroxyethyl cellulose, carboxymethyl cellulose, starch, and the like. Note that the heat insulating layers 26 and 27 may include, for example, various additives such as an ultraviolet ray absorber or the like.

(1-2. Method of Recording on Recording Medium)

It is possible for the recording device 1 according to the present embodiment to perform recording on the recording medium 2A, for example, as follows.

First, the recording medium 2A is disposed on an XY biaxial stage 210. As described above, the recording medium 2A includes the three layers (the recording layers 24M, 24C, and 24Y) that develop different colors. Therefore, in the recording device 1, the light sources 11A, 11B, and 11C respectively corresponding to the photothermal conversion materials included in the recording layers 24M, 24C, and 24Y are used. As described above, the light source 11A includes, for example, the semiconductor laser 111A that corresponds to the recording layer 22M and causes, for example, one having a wavelength of 915 nm to oscillate. As described above, the light source 11B includes, for example, the semiconductor laser 111B that corresponds to the recording layer 22C and causes, for example, one having a wavelength of 860 nm to oscillate. As described above, the light source 11C includes, for example, the semiconductor laser 111C that corresponds to the recording layer 22Y and causes, for example, one having a wavelength of 760 nm to oscillate.

After the beam shaping lens 13 shapes a beam shape of light (the laser light Lia) emitted from the light source 11A, the light sequentially passes through the dichroic mirrors 14 and 15 and the condensing lens 16, and further, the recording medium 2A is irradiated with the light via the reflection-type polarizer 12. This causes the recording layer 24M to develop the color. After the beam shaping lens 13 shapes a beam shape of light (the laser light Lib) emitted from the light source 11B, the light is reflected by the dichroic mirror 14, sequentially passes through the dichroic mirror 15 and the condensing lens 16, and further, the recording medium 2A is irradiated with the light via the reflection-type polarizer 12. This causes the recording layer 24C to develop the color. After the beam shaping lens 13 shapes a beam shape of light (the laser light Lic) emitted from the light source 11C, the light is reflected by the dichroic mirror 15, passes through the condensing lens 16, and further, the recording medium 2A is irradiated with the light via the reflection-type polarizer 12. This causes the recording layer 24Y to develop the color.

Regarding writing on the recording medium 2A, for example, it is possible to perform recording on a desired region by scanning the XY biaxial stage 210 in an in-plane direction. At this time, by modulating outputs of the laser light Lia, the laser light Lib, and the laser light Lic in synchronization with the scanning, it is possible to shade the record on each of the recording layers 24M, 24C, and 24Y.

In the recording device 1 according to the present embodiment, the reflection-type polarizer 12 is disposed at a position opposed to the recording medium 2A. As described above, the transmission axis of the reflection-type polarizer 12 coincides with the polarization direction of the laser light Lia, the laser light Lib, and the laser light Lic, and the reflection-type polarizer 12 is disposed to be approximately perpendicular to the optical axes of the laser light Lia, the laser light Lib, and the laser light Lic. For example, polarized light Lt (X polarized light or horizontally-polarized light) parallel to the X axis of the light (the laser light Lia, the laser light Lib, and the laser light Lic), which is not absorbed by the corresponding one of the recording layers 24M, 24C, and 24Y and is reflected by the optical thin film 23 disposed below the recording layer 24, passes through the reflection-type polarizer 12. Polarized light Lr (Y polarized light or perpendicularly-polarized light) parallel to the Y axis is reflected by the reflection-type polarizer 12, and the recording medium 2A is irradiated with the polarized light Lr again. A portion of the laser light Lia, the laser light Lib, and the laser light Lic that have been applied again is absorbed by the corresponding one of the recording layers 24M, 24C, and 24Y, and the portion thereof is reflected by the optical thin film 23. In a manner similar to that described above, regarding the reflected light, the polarized light Lr parallel to the Y axis is reflected by the reflection-type polarizer 12, and the recording medium 2A is irradiated with the polarized light Lr. These are repeated. Therefore, the use efficiency of the laser light Lia, the laser light Lib, and the laser light Lic of each of the recording layers 24M, 24C, and 24Y is improved.

Note that, in FIG. 1, for convenience, the optical paths of the light reflected by the optical thin film 23 and the light reflected by the reflection-type polarizer 12 are illustrated as being different from each other. However, actually, the optical paths pass through the same region.

(1-3. Workings and Effects)

As described above, the heat-sensitive recording medium has been developed in recent years that includes the recording layer including the heat-sensitive color-developing composition and the photothermal conversion agent that absorbs infrared rays. The heat-sensitive recording medium using such a photothermal conversion effect allows for recording of information, for example, by applying the laser light and converting the applied laser light into heat as recording on the recording layer in a non-contact state. As described above, for the heat-sensitive recording medium that uses the laser light as the recording method, it is requested to improve a recording speed and a display quality. Development of a recording device that enables improvement a laser use efficiency is desired.

In view of this, in the recording device 1 according to the present embodiment, the reflection-type polarizer 12 that has the transmission axis coinciding with the polarization direction of the laser light is disposed on the optical path of the laser light Li emitted from the light source 11. Specifically, for example, it is disposed at a position opposed to the recording medium 2A to cause the transmission axis to coincide with the polarization directions of the laser light Lia, the laser light Lib, and the laser light Lic and is disposed to be approximately perpendicular to the optical axes of the laser light Lia, the laser light Lib, and the laser light Lic. This causes each of the laser light Lia, the laser light Lib, and the laser light Lic that is not absorbed by the recording layer 24 of the recording medium 2A and is reflected by, for example, the optical thin film 23 is reflected by the reflection-type polarizer 12 again, and the recording medium 2A is irradiated with the laser light. That is, it is possible to multiply reflect the laser light Lia, the laser light Lib, and the laser light Lic between the reflection-type polarizer 12 and the optical thin film 23 of the recording medium 2A.

As described above, in the recording device 1 according to the present embodiment, the reflection-type polarizer 12 that has the transmission axis coinciding with the polarization direction of the laser light Li is disposed in the emission direction (on the optical path) of the laser light Li. Therefore, it is possible to multiply reflect the laser light Li between the reflection-type polarizer 12 and the optical thin film 23 of the recording medium 2A that is an object to be irradiated. This improves an amount of the laser light Li absorbed by the recording layer 24 of the recording medium 2A, and it is possible to provide the recording device having high use efficiency of the laser light Li.

Furthermore, since it is possible for the recording medium 2A to efficiently absorb the laser light, it is possible to improve the recording speed. Furthermore, it is possible to inexpensively provide the recording device 1.

Next, second to fourth embodiments of the present disclosure will be described. Hereinafter, a component similar to that in the first embodiment is denoted with the same reference numeral, and description thereof is appropriately omitted.

2. Second Embodiment

FIG. 3 schematically illustrates a configuration of a main portion of a laser device (a recording device 3) according to the second embodiment of the present disclosure together with an object to be irradiated (a recording medium 2A). As in the first embodiment described above, the recording device 3 uses, for example, a semiconductor laser (for example, a semiconductor laser 111A) as a light source 11 and records information on the recording medium 2A by irradiating the recording medium 2A with oscillating laser light (laser light Li) from the semiconductor laser 111A. The recording device 3 according to the present embodiment is different from that in the first embodiment in that a retarder 17 is disposed between a reflection-type polarizer 12 and the recording medium 2A.

As described above, in the recording device 3, the retarder 17 is disposed between the reflection-type polarizer 12 and the recording medium 2A. The recording device 3 has a configuration in which the reflection-type polarizer 12 and the retarder 17 are disposed in order from the side of the light source 11 on an optical path of the laser light Li oscillated from the side of the light source 11.

The retarder 17, for example, changes polarization of the laser light Li reflected by the optical thin film 23 of the recording medium 2A. As the retarder 17, for example, it is possible to use a retarder whose phase difference amount is approximately $\lambda/8$ or a retarder having a retardation that is equal to or more than 500,000 nm.

When the light Li reflected by the recording medium 2A enters the reflection-type polarizer 12, it is preferable to make a half of polarization components pass through the reflection-type polarizer 12 and the other half of the polarization components be reflected by the reflection-type polarizer 12. Since a recording layer 24 and heat insulating layers 26 and 27 included in the recording medium 2A are formed by using an organic material, there are many cases in general where a phase difference is caused between X polarized light and Y polarized light. However, there is a possibility that a phase difference amount (retardation) of the recording medium 2A is almost zero or that it is not possible to manage the retardation of the recording medium 2A. In this case, by disposing the retarder 17 between the recording medium 2A and the reflection-type polarizer 12, it is possible to cause a polarization state of the light Li reflected by the recording medium 2A to be appropriate.

FIG. 4 illustrates a relationship between wavelengths and intensities of light (X polarized light) entering the retarder 17 and light (X polarized light and Y polarized light) exiting from the retarder 17 in a case where a λ/8 plate is used as the retarder 17. For example, in a case where the retardation of the recording medium 2A is almost zero, it is preferable that a phase difference amount of the retarder 17 be set to λ/8 and that the retarder 17 be disposed to allow a slow axis direction of the retarder 17 have an angle of 45° (or 135°) with respect to the transmission axis of the reflection-type polarizer 12. With this arrangement, since the light exiting from the retarder 17 becomes circularly-polarized light, a half of the light is reflected by the reflection-type polarizer 12 and enters the recording medium 2A again. In a case where laser light having a plurality of wavelengths is used as in FIG. 2, it is preferable that a phase difference amount be set to λ/8 of a value of an approximate average of the wavelengths. Specifically, in a case where three types of the laser light (Lia, Lib, and Lic) having three wavelengths of 915 nm, 860 nm, and 760 nm are used, for example, it is preferable to use a retarder having a phase difference amount of 106 nm.

However, in a case where the recording medium 2A itself has the retardation, it is difficult to set an appropriate polarization state by the above method. In this case, it is preferable to select the retarder 17 having a large retardation. As the retarder having a large retardation, for example, it is preferable to use a crystal (for example, calcite) having an optical birefringence. The large retardation is, for example, equal to or more than 500,000 nm.

FIG. 5 illustrates a relationship between wavelengths and intensities of the light (X polarized light) entering the retarder 17 and the light (X polarized light and Y polarized light) exiting from the retarder 17 in a case where the calcite is used as the retarder 17. The calcite has a large retardation. Even when the recording layer 24 and the heat insulating layers 26 and 27 of the recording medium 2A have retardations, an effect of the retardations is small. Therefore, the calcite has resistance to variation in the retardations of the recording layer 24 and the heat insulating layers 26 and 27 of the recording medium 2A. For example, when calcite having Δn=0.1 and a thickness of 7.5 mm is disposed, it is possible to change the polarization state for each wavelength, and it is easy to divide the polarization components of the light Li entering the reflection-type polarizer 12 into a half that passes through the reflection-type polarizer 12 and a half that is reflected by the reflection-type polarizer 12.

As described above, in the present embodiment, since the retarder 17 is disposed between the reflection-type polarizer 12 and the recording medium 2A, it is possible to adjust the polarization component of the laser light Li reflected by the recording medium 2A to be in an appropriate state. Therefore, the amount of the laser light Li absorbed by the recording layer 24 included in the recording medium 2A is improved, and it is possible to provide a recording device that has further higher use efficiency of the laser light Li.

3. Third Embodiment

FIG. 6 illustrates an example of an overall configuration of a laser device (an annealing device 4) according to a third embodiment of the present disclosure. The annealing device 4 is directed to, for example, denaturing of amorphous silicon (a-Si) into polysilicon (poly-Si). The annealing device 4 according to the present embodiment includes a light source 11 and a reflection-type polarizer. The annealing device 4 further includes, for example, an optical system 33, a homogenizer 34, and a mirror 35 between the light source 11 and a reflection-type polarizer 12 that has a transmission axis coinciding with a polarization direction of laser light Li.

In the annealing device 4 according to the present embodiment, after the laser light Li emitted from the light source 11 passes through the optical system 33 including a plurality of lenses, the homogenizer 34 shapes and homogenizes a beam shape of the laser light Li and cause the laser light Li to exit therefrom. The laser light Li exiting from the homogenizer 34 is reflected by the mirror 35, and an object to be irradiated 2B is irradiated with the laser light Li through the reflection-type polarizer 12.

In the annealing device 4, for example, it is preferable to use a high-output one such as an excimer laser as the light source 11. It is preferable that the object to be irradiated 2B be disposed in a chamber 36 in which any gas is sealed. The object to be irradiated 2B is placed on an XY biaxial stage 210. It is possible to anneal an entire surface of the object to be irradiated 2B by scanning the XY biaxial stage 210 in an in-plane direction, and it is possible to denature the object to be irradiated 2B. Furthermore, by turning on or off the laser light Li in accordance with the scanning of the XY biaxial stage 210, it is possible to denature only a desired region of the object to be irradiated 2B.

As described above, in the present embodiment, since the reflection-type polarizer 12 that has the transmission axis coinciding with the polarization direction of the laser light Li is disposed in the emission direction of the laser light Li, it is possible to multiply reflect the laser light Li between the reflection-type polarizer 12 and the object to be irradiated 2B. This makes it possible to provide an annealing device having high use efficiency of the laser light Li.

Furthermore, since it is possible for the object to be irradiated 2B to efficiently absorb the laser light, it is possible to shorten irradiation time. Furthermore, it is possible to inexpensively provide the recording device 3.

Moreover, as in the second embodiment described above, a retarder 17 may be disposed between the reflection-type polarizer 12 and the object to be irradiated 2B. This makes it possible to adjust the polarization component of the laser light Li reflected by the object to be irradiated 2B to be in an appropriate state, and it is possible to further improve the use efficiency of the laser light Li.

4. Fourth Embodiment

FIG. 7 illustrates an example of an overall configuration of a laser device (a processing device 5) according to a fourth embodiment of the present disclosure. The processing device 5, for example, cuts an object (a workpiece 2C). The processing device 5 according to the present embodiment includes a light source 11 and a reflection-type polarizer. The processing device 5 further includes, for example, an optical system 33, a homogenizer 34, and a mirror 35 between the light source 11 and the reflection-type polarizer that has a transmission axis coinciding with a polarization direction of laser light Li.

In the processing device 5 according to the present embodiment, as in the third embodiment described above, after the laser light Li emitted from the light source 11 passes through the optical system 33 including a plurality of lenses, the homogenizer 34 shapes and homogenizes a beam shape of the laser light Li and causes the laser light Li to exit therefrom. The laser light Li exiting from the homogenizer 34 is reflected by the mirror 35, and the workpiece 2C is irradiated with the laser light Li through a reflection-type polarizer 12.

In the processing device 5, when the workpiece 2C is irradiated with the laser light Li, processing chips (debris) on which ablation has been performed (melted) are scattered. Therefore, it is preferable to dispose the reflection-type polarizer 12 at a distance of, for example, about one cm to 10 cm from the workpiece 2C to prevent attachment of the debris. Moreover, it is preferable to provide a debris collection mechanism 46 between the reflection-type polarizer 12 and the workpiece 2C. The debris collection mechanism 46, for example, suctions the debris by wind and discharges the collected debris together with exhaust air. The workpiece 2C is placed on an XY biaxial stage 210, and it is possible to process a desired region of the workpiece 2C by scanning the XY biaxial stage 210 in an in-plane direction.

As described above, in the present embodiment, since the reflection-type polarizer 12 that has the transmission axis coinciding with the polarization direction of the laser light Li is disposed in the emission direction of the laser light Li, it is possible to multiply reflect the laser light Li between the reflection-type polarizer 12 and the workpiece 2C. This makes it possible to provide a processing device having high use efficiency of the laser light Li.

Furthermore, since it is possible to make the workpiece 2C efficiently absorb the laser light, it is possible to shorten irradiation time. Furthermore, it is possible to inexpensively provide the processing device 5.

Moreover, as in the second embodiment, a retarder 17 may be disposed between the reflection-type polarizer 12 and the workpiece 2C. This makes it possible to adjust a polarization component of the laser light Li reflected by the workpiece 2C to be in an appropriate state, and it is possible to further improve the use efficiency of the laser light Li.

5. Application Examples

Next, for example, application examples of a recording medium on which information is allowed to be recorded by using the recording device 1 described above in the first embodiment will be described. However, a configuration of the recording medium to be described below is merely an example, and it is possible to appropriately change the configuration. It is possible to apply the recording medium to a portion of various electronic apparatuses or an accessory. For example, the recording medium is applicable to a portion of an accessory such as a clock (watch), a bag, clothes, a hat, glasses, and shoes as, for example, a so-called wearable terminal. The kind of the electric apparatus and the like is not particularly limited. Furthermore, in addition to the electric apparatuses and the accessories, it is possible to apply the recording medium, an exterior member, to interior and exterior decoration such as a wall of a building, and exterior decoration or the like of furniture such as a desk, for example.

(First Application Example)

FIGS. 8A and 8B illustrate an appearance of an Integrated Circuit (IC) card having a rewrite function. A surface of the IC card is a print surface 310, and for example, a sheet-like recording medium 2A or the like is bonded to the print surface. By disposing the recording medium 2A or the like on the print surface 310 of the IC card, it is possible to appropriately perform drawing, rewriting, and deleting on the print surface as illustrated in FIGS. 8A and 8B.

(Second Application Example)

FIG. 9A illustrates an appearance configuration of a front surface of a smartphone, and FIG. 9B illustrates an appearance configuration of a back surface of the smartphone illustrated in FIG. 9A. The smartphone includes, for example, a display 410, a non-display 420, and a housing 430. For example, on one surface of the housing 430 on the back surface side, for example, the recording medium 2A or the like is provided as an exterior member of the housing 430. This makes it possible to display various colors and patterns as illustrated in FIG. 9B. Note that, here, the smartphone has been described as an example. However, the application example is not limited to this, and for example, it is possible to apply it to a laptop personal computer (PC), a tablet PC, or the like.

(Third Application Example)

FIGS. 10A and 10B illustrate an appearance of a bag. The bag includes, for example, a containing portion 510 and a handle 520. For example, the recording medium 2A is attached to the containing portion 510, for example. On the containing portion 510, various characters and patterns are displayed, for example, by the recording medium 2A. Furthermore, it is possible to display various colors and patterns by attaching the recording medium 2A or the like to the handle 520 portion, and it is possible to change the design of the containing portion 510 as in the examples in FIGS. 10A and 10B. It is possible to achieve an electronic device that is useful for fashion applications.

(Fourth Application Example)

FIG. 11 illustrates an exemplary configuration of a wristband on which, for example, an attraction boarding history, schedule information, or the like is allowed to be recorded, for example, in an amusement park. The wristband includes belts 611 and 612 and an information recorder 620. Each of the belts 611 and 612 has, for example, a band-like shape, and ends (not illustrated) are configured to be couplable to each other. For example, the recording medium 2A or the like is bonded to the information recorder 620, and in addition to a boarding history MH2 of the attraction and schedule information IS (IS1 to IS3) described above, for example, an information code CD is recorded thereon. In the amusement park, it is possible to record the information described above by holding the wristband over drawing units placed in various places such as an attraction boarding reservation spot or the like by a visitor.

A boarding history mark MH1 indicates the number of attractions on which the visitor who wears the wristband has boarded in the amusement park. In this example, as the number of attractions on which the visitor has boarded is larger, more star marks are recorded as the boarding history marks MH1. Note that this is non-limiting, and for example, a color of the mark may be changed depending on the number of attractions on which the visitor has boarded.

The schedule information IS indicates a schedule of a visitor in this example. In the example, information regarding all events including an event reserved by the visitor and an event held in the amusement park is recorded as the schedule information IS1 to IS3. Specifically, in this example, a name of the attraction (an attraction 201) of which a boarding reservation is made by the visitor and a scheduled boarding time are recorded as the schedule information IS1. Furthermore, an event in the park such as a parade and a scheduled starting time are recorded as the schedule information IS2. Furthermore, a restaurant reserved by the visitor in advance and a scheduled mealtime are recorded as the schedule information IS3.

In the information code CD, for example, identification information IID used to identify the wristband and website information IWS are recorded.

6. Examples

Next, Examples of the present disclosure will be described in detail. (Experiment: Evaluation of Intensity of Light Absorbed by Recording Layer)

An intensity of light absorbed by a recording layer of a recording medium was simulated. The recording medium included a diffusion reflection layer, an adhesive layer, an optical thin film corresponding to the optical thin film 23 according to the first embodiment described above, reflecting infrared rays, and transmitting visible light, a recording layer developing a color of magenta, a heat insulating layer, a recording layer making cyan appear, a heat insulating layer, a recording layer developing a color of yellow, and a protection film on a support base in this order. In the present experiment, it was assumed that an infrared ray laser causing one having a wavelength, to oscillate, corresponding to a photothermal conversion material included in the recording layer developing the color of magenta be used as light applied on the recording layer and that an absorption rate thereof be 30%.

First, as an experimental example 1, a case was simulated where the above-described recording medium was directly irradiated with the infrared ray laser and recording was performed. In the above case, a case where the optical thin film 23 had infrared ray (IR) reflectance of 100% was assumed as an experiment example 1-1, and a case of IR reflectance of 80% was assumed as an experiment example 1-2. Next, as an experimental example 2, a case was simulated where a reflection-type polarizer was disposed on the recording medium and recording was performed. In the above case, a case where the optical thin film 23 had infrared ray (IR) reflectance of 100% was assumed as an experiment example 2-1, and a case of IR reflectance of 80% was assumed as an experiment example 2-2.

FIG. 12 is a summary of the simulation results and illustrates a relationship between the intensity of the light absorbed by the recording layer and IR reflectance in each of the experimental examples 1 and 2. It was found that an amount of the light absorbed by the recording layer in the experimental example 2 was larger than that in the experimental example 1. From this, it was found that a laser absorption rate of the recording layer was improved and it was possible to achieve a higher speed of recording on the recording layer by disposing the reflection-type polarizer on the recording layer.

The present disclosure has been described above referring to the first to fourth embodiments and Examples. However, the present disclosure is not limited to modes described above in the embodiments and the like, and it is possible to variously modify the present disclosure. For example, it is not necessary to include all the components described above in the embodiments or the like, and another component may be further included. Furthermore, the material and the thickness of the component described above are merely examples and are not limited to those described above.

For example, in general, regarding a semiconductor laser, there is a possibility that an output of the laser light becomes unstable or the semiconductor is broken by so-called return light that is reflected laser light that returns to the semiconductor laser. In that case, it is possible to cope with the above case by slightly inclining the object to be irradiated 2 and the reflection-type polarizer 12 with respect to the optical axis of the laser light Li. Alternatively, a cubic polarization beam splitter having a 45° reflection surface may be disposed between the semiconductor laser (for example, the semiconductor laser 111A) and the reflection-type polarizer 12. In that case, by setting a polarization transmission axis of the polarization beam splitter to be the polarization direction of the semiconductor laser 111A, light emitted from the semiconductor laser 111A passes through the polarization beam splitter, and light that has passed through the reflection-type polarizer 12 and has returned is reflected by the reflection surface. Therefore, it is possible to reduce the return light.

Note that the effects described herein are only exemplary and non-limiting. Furthermore, any other effect may be provided.

Note that it is possible for the present disclosure to have the following configurations.

(1)
  A laser device including:
  a light source that causes laser light to oscillate; and
  a reflection-type polarizer that is disposed on an optical path of the laser light and has a transmission axis coinciding with a polarization direction of the laser light.

(2)
  The laser device according to claim 1, in which the reflection-type polarizer includes an entrance surface that is disposed to be approximately perpendicular to an optical axis of the laser light.

(3)
  The laser device according to claim 1, in which a retarder is disposed ahead of the laser light exiting from the reflection-type polarizer.

(4)
  The laser device according to claim 3, in which a retarder having a phase difference amount of about λ/8 or a retarder having a retardation equal to or more than 500,000 nanometers is used as the retarder.

(5)
  A laser processing method including irradiating an object to be irradiated with oscillating laser light from a light source through a reflection-type polarizer that has a transmission axis coinciding with a polarization direction of the laser light.

(6)
  The laser processing method according to claim 5, in which the object to be irradiated is irradiated, further through a retarder, with the laser light that has passed through the reflection-type polarizer.

(7)
  The laser processing method according to claim 5, further including placing the object to be irradiated on an XY biaxial stage, and scanning the XY biaxial stage in an in-plane direction to irradiate, with the laser light, a desired region of the object to be irradiated.

(8)
  A laser processed object processed by the laser processing method according to (5) described above.

The present application claims priority based on Japanese Patent Application No. 2017-243545 filed with the Japan Patent Office on Dec. 20, 2017, the entire contents of which are incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:

1. A laser device comprising:
   a light source that causes laser light to oscillate; and
   a reflection-type polarizer that is disposed on an optical path of the laser light and has a transmission axis coinciding with a polarization direction of the laser light such that the laser light is configured to be multiply reflected by the reflection-type polarizer,
   wherein a retarder is disposed ahead of the laser light exiting from the reflection-type polarizer.

2. The laser device according to claim 1, wherein the reflection-type polarizer includes an entrance surface that is disposed to be approximately perpendicular to an optical axis of the laser light.

3. The laser device according to claim 1, wherein a retarder having a phase difference amount of about $\lambda/8$ or a retarder having a retardation equal to or more than 500,000 nanometers is used as the retarder.

4. A laser processing method comprising irradiating an object to be irradiated with oscillating laser light from a light source through a reflection-type polarizer that has a transmission axis coinciding with a polarization direction of the laser light, wherein the laser light is multiply reflected by the reflection-type polarizer, and wherein the object to be irradiated is irradiated, further through a retarder, with the laser light that has passed through the reflection-type polarizer.

5. The laser processing method according to claim 4, wherein the reflection-type polarizer includes an entrance surface that is disposed to be approximately perpendicular to an optical axis of the laser light.

6. The laser processing method according to claim 4, wherein the retarder has a phase difference amount of about $\lambda/8$ or has a retardation equal to or more than 500,000 nanometers.

7. A laser processing method comprising:
   irradiating an object to be irradiated with oscillating laser light from a light source through a reflection-type polarizer that has a transmission axis coinciding with a polarization direction of the laser light, wherein the laser light is multiply reflected by the reflection-type polarizer, and
   placing the object to be irradiated on an XY biaxial stage, and scanning the XY biaxial stage in an in-plane direction to irradiate, with the laser light, a desired region of the object to be irradiated.

8. The laser processing method of claim 7, wherein a retarder is disposed ahead of the laser light exiting from the reflection-type polarizer.

9. The laser processing method according to claim 8, wherein the retarder has a phase difference amount of about $\lambda/8$ or has a retardation equal to or more than 500,000 nanometers.

10. The laser processing method according to claim 7, wherein the reflection-type polarizer includes an entrance surface that is disposed to be approximately perpendicular to an optical axis of the laser light.

* * * * *